United States Patent [19]

Garden

[11] 4,281,093
[45] Jul. 28, 1981

[54] CATALYST COMPOSITIONS AND THEIR USE IN THE PREPARATION OF RELEASE COATINGS

[75] Inventor: William D. Garden, Largs, Scotland

[73] Assignee: Imperial Chemical Industries Limited, London, England

[21] Appl. No.: 107,853

[22] Filed: Dec. 28, 1979

[30] Foreign Application Priority Data

Jan. 31, 1979 [GB] United Kingdom ............... 03438/79

[51] Int. Cl.$^3$ ............................................. C08G 77/06
[52] U.S. Cl. ............................... 528/15; 260/33.2 SB; 252/429 R; 252/431 R; 252/431 N; 252/431 P; 252/431 C; 427/387; 528/31; 528/32
[58] Field of Search ........... 252/429 R, 431 R, 431 N, 252/431 P, 431 C; 528/15, 31, 32; 260/332 SB; 427/387

[56] References Cited

U.S. PATENT DOCUMENTS

| | | | |
|---|---|---|---|
| 3,936,581 | 2/1976 | Garden | 428/447 |
| 3,960,810 | 6/1976 | Chandra et al. | 528/15 |
| 4,064,154 | 12/1977 | Chandra et al. | 252/429 R |
| 4,108,833 | 8/1978 | Hatanaka et al. | 260/37 SB |
| 4,123,604 | 10/1978 | Sandford, Jr. | 528/31 |
| 4,162,356 | 7/1979 | Grenoble | 428/447 |

FOREIGN PATENT DOCUMENTS 2228088 of 0000 France.

*Primary Examiner*—Melvyn I. Marquis
*Attorney, Agent, or Firm*—Cushman, Darby & Cushman

[57] ABSTRACT

A catalyst composition comprising a solution of an organo-metallic complex of platinum or rhodium in a liquid allyl ether which has a b.p. of at least 150° C. at 1 bar and which is free from groups having an adverse effect on the catalytic affect of the complex; polyorganosiloxane coating compositions containing a Si—H polysiloxane and a polysiloxane containing Si—OH, Si-vinyl or Si-allyl groups, an organo-metallic complex of platinum or rhodium and an allyl ether as defined above; and the use of the compositions for preparing release coatings on substrates.

In the coating of substrates, especially paper, with release coatings based on heat-curable polysiloxane compositions, organo-metallic complexes of platinum or rhodium can be used as catalysts provided they are dissolved in the composition. The low-boiling solvents hitherto used have disadvantages in causing atmospheric pollution and requiring solvent-recovery plant. The ethers defined can be used in place of the low-boiling solvents to give satisfactory coatings without the mentioned disadvantages.

5 Claims, No Drawings

CATALYST COMPOSITIONS AND THEIR USE IN THE PREPARATION OF RELEASE COATINGS

This invention relates to new catalyst compositions useful in the preparation of release coatings on substrates, such as paper.

The use of catalysed cross-linkable organopolysiloxane compositions for forming coatings which confer release properties on substrates is well known. Such compositions consist, broadly, of a linear diorganopolysiloxane containing silicon-bonded hydroxyl or aliphatically unsaturated groups, a cross-linking agent and a catalyst. In the early developments in this field, hydroxyl-containing polysiloxanes were cross-linked using silicates or acyloxysilanes together with catalysts based on organotin compounds. These systems use substantial amounts of organic solvents to prepare the coating applied to the substrate and a considerable disadvantage of these systems is the need to collect the evaporated solvent, partly on account of the expense and partly on account of environmental and fire hazards. Accordingly, a good deal of attention is now being devoted to "solventless" systems in which the amount of volatile solvent is being reduced as far as possible and preferably eliminated altogether. These systems revolve round the use of a polysiloxane containing silicon-bonded hydrogen as cross-linking agent for a diorganopolysiloxane containing silicon-bonded hydroxyl or aliphatically unsaturated groups, usually vinyl or allyl, using a catalyst of the platinum or rhodium series. The catalysts effective in this connection are organometal complexes; with few exceptions they are not soluble in a medium consisting solely of polysiloxanes and are much reduced in their catalytic effect if used in suspension. One method of countering this defect is to add the catalyst as a solution in a ketone, hydrocarbon or ester solvent, even small amounts of such solvents changing the polysiloxane mixture to one which will hold the catalyst in solution. However, even the small amount of solvent used for this purpose represents an environmental and fire hazard which it is desirable to eliminate.

It has now been found that liquid allyl ether compounds can be used as solvents for the above-mentioned catalysts and that solutions of these catalysts in liquid allyl ether compounds which (a) are free from groups having a deleterious effect on the catalytic activity of the catalyst, and (b) have a boiling point of at least 150° C. at 1 bar pressure, when added to mixtures of organopolysiloxanes of the kind described above provide a catalysed coating composition in which the catalyst is in solution and which has a low solvent loss under normal curing conditions.

Thus according to one feature of the invention there are provided solutions of organo-metallic complex compounds, in which the metal is platinum or rhodium in liquid allyl ether compounds which have a boiling point of at least 150° C. at 1 bar and which are free from groups which have a deleterious effect on the activity of the organo-metallic complex as a catalyst for the condensation of polysiloxanes containing silicon-bonded hydrogen with diorganopolysiloxanes containing silicon-bonded hydroxyl or allyl or vinyl groups.

As organo-metallic complex compounds, there may be used more especially complexes of rhodium or platinum or their halides which contain one or more organic groups and in which the metal forms one or more bonds with atoms selected from Groups IVA, Va and VIa in periods 2, 3, 4 and 5 of the Periodic Table. An organic group may be bonded to the metal atom or to any of the atoms selected as described from the Periodic Table. Suitable organic groups include alkyl, alkoxy and aryl groups, e.g. methyl, acetylisopropoxy or phenyl groups, also ethylenically or acetylenically unsaturated compounds, e.g. ethylene, cyclohexene and 2,2,5-trimethylhex-3-yne.

As examples of particular organo-metallic compounds, there may be mentioned tris(dibutyl sulphide) rhodium trichloride, bis(hexa-1,5-diene)$\mu$-dichlorodirhodium, allyl ether rhodium acetylacetonate, bis(diethylsulphide)dichloroplatinum, bis(2,2,5-trimethylhex-3-yne)dichloro-$\mu$-dichlorodiplatinum, bis(propionitrile)dichloroplatinum, bis(tripropylphosphine)dithiocyano-$\mu$-dithiocyanodiplatinum, (p-toluidine)ethylenedichloroplatinum, bis(triethylphosphine)diphenylplatinum, bis(benzonitrile) dichloroplatinum, bis(dipropylsulphide)dichloro-$\mu$-dichloro diplatinum, bis(tripropylarsine)dichloroplatinum, bis(dimethylphenylphosphine)bis(methyldiphenylsilyl) platinum, bis(dimethylphenylphosphine)-(triphenylgermyl) chloroplatinum, bis(triethylarsine)dimethylplatinum, [bicyclo-(2,2,1)-hepta-2,5-diene]dichloroplatinum, (tripropylphosphine)-ethylenedichloroplatinum, bis(tripropylphosphine)dichloro-$\mu$-ethylmercaptylchlorodiplatinum, and the catalyst prepared as described in Example 1 of U.S. Pat. No. 3,220,972.

The liquid allyl ether compound must have a boiling point of at least 150° C. at 1 bar and it must be free from groups which have a deleterious effect on the activity of the organo-metallic complex as a catalyst for the reaction of organohydrogenpolysiloxanes with hydroxyl-, allyl- or vinyl-group containing diorganopolysiloxanes. Groups of this kind are those containing nitrogen, phosphorus, arsenic or antimony in the trivalent state, or sulphur, selenium or tellurium in the divalent state. The liquid allyl ether compounds should also preferably be free of groups containing a labile hydrogen atom, e.g. hydroxyl, carboxylic or sulphonic acid group. Preferably, the allyl ether compound should contain only C, H, O and, optionally, Si atoms. A preferred class of such compounds are the dialkyl ethers of mono-acylated aliphatic trihydroxy compounds, especially those where the acyl radical contains 2 to 5 carbon atoms.

As particular examples of allyl ether compounds, there may be mentioned phenyl allyl ether, glycerol-1,2-diisobutyrate-3-monoallyl ether, glycerol-1,2-dicaproate-3-monoallyl ether, n-2,2-di(allyloxymethyl)-butylisobutyrate, n-2,2-di(allyloxymethyl)butyl-2-ethylbutyrate, n-2,2-di (allyloxymethyl)butyl acetate, 2,2,2-tri(allyloxymethyl) ethylacetate, pentaerythritol tetraallyl ether, $\alpha,\alpha$-di(allyloxy)toluene, and mono-allyl heptaethyl trisilicate.

For convenience in storage and use as a catalyst in coating operations it is preferred to have a solution of the organo-metal complex containing from 0.00001 to 0.01 parts by weight of the metal for each 1 part by weight of the allyl ether compound.

As noted earlier the organometal complex solutions are useful as an additive to mixtures of polysiloxanes containing silicon bonded hydrogen and diorganopolysiloxanes containing silicon-bonded hydroxyl-, allyl- or vinyl groups which are used as release coatings for substrates.

Thus according to a further feature of the invention there is provided catalysed coating compositions containing at least two liquid organopolysiloxanes, at least one of which contains silicon-bonded hydrogen, and at least one of which contains silicon-bonded hydroxyl, allyl or vinyl groups, together with an organo-metallic complex compound as hereinbefore defined, and sufficient of a liquid allyl ether compound as hereinbefore defined to dissolve said organometallic complex in the composition.

The invention also provides a process for coating a substrate with an organopolysiloxane release coating which comprises applying to the substrate a catalysed coating composition as defined above, and heating the substrate to a temperature sufficient to cure the coating composition to a solid film.

The above process can be applied to a variety of substrates, for example, wood, metal, ceramics and plastics films but is particularly useful for application to paper for use as a protective strippable cover in connection with, for example, the production of self-adhesive labels.

The liquid organopolysiloxanes used are well known and readily available from commercial sources. The organo groups attached to silicon can be selected from a wide variety of alkyl, alkenyl, aryl or substituted alkyl groups but for ease of availability and cost, the organo groups in the organopolysiloxane, other than allyl or vinyl, will normally be solely a lower alkyl, especially methyl, group or mainly be lower alkyl together with a minor proportion of phenyl groups. The preferred organopolysiloxanes containing silicon-bonded hydrogen are represented by the formulae:

$$(CH_3)_3SiO[(CH_3)_2SiO]_a[(CH_3HSiO]_bSi(CH_3)_3 \quad (1)$$

and

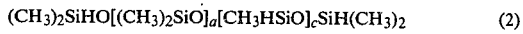

$$(CH_3)_2SiHO[(CH_3)_2SiO]_a[CH_3HSiO]_cSiH(CH_3)_2 \quad (2)$$

where a and c are 0 or an integer and b is an integer of at least 2, having a viscosity at 20° C. of from 15 to 150 cP.

The hydroxyl, vinyl or allyl groups in the organopolysiloxanes containing these groups can be attached to any of the silicon atoms forming the polysiloxane chain. In the organopolysiloxanes containing vinyl or allyl groups, these groups preferably represent from 0.1 to 5% of the total silicon-bonded radicals, and even more preferably, at least 80% of the remaining silicon-bonded materials are methyl groups.

The preferred organopolysiloxanes of this kind are copolymers of dimethylsiloxane units and methylvinyl siloxane units, end-stopped by trimethylsilyl, dimethylvinyl silyl or phenyldimethylsilyl units.

The preferred organopolysiloxanes containing hydroxyl groups are represented by the formula:

$$HO.(CH_3)_2SiO[(CH_3)_2SiO]_cSi(CH_3)_2OH \quad (3)$$

wherein c is an integer such that the organopolysiloxane has a viscosity at 20° C. of from 40 to 4000 cP.

Suitable organopolysiloxanes of the above kinds are described in more detail in UK Pat. Nos. 1038876, 1374792 and 1399885.

In general, the organopolysiloxane containing silicon-bonded hydrogen will constitute a minor proportion of the catalysed coating composition, the usual proportion being from 5% to 40% by weight of the organopolysiloxanes present. The amount present should be sufficient to give a readily-curable catalysed coating composition. Using organopolysiloxanes containing vinyl or allyl groups, the amount should be sufficient to give at least 0.5 hydrogen atom for each vinyl or allyl group in the organopolysiloxane together with at least one hydrogen atom for each allyl group present in the allyl ether compound. Using organopolysiloxanes containing hydroxyl groups, the amount should be sufficient to provide at least one silicon-bonded hydrogen for each allyl or hydroxyl group present in the catalysed coating composition.

The catalyst used can be either a platinum or a rhodium catalyst. The former is conventionally used in an amount providing 22 to 220 parts of platinum per million by weight of the catalysed coating composition; rhodium compounds are usually used in smaller amounts and about one-quarter the above limits apply.

In carrying out the process of the invention, the catalysed coating composition may be applied by any suitable method to the substrate, e.g. by spraying, dipping, knife coating, roll coating, reverse roll coating or by gravure cylinders, and may be cured by any suitable means, for example, by heating by hot air, infra-red or UV radiation, the conditions chosen in any specific case being dependent on the nature of the composition used. In general, catalysed coating compositions are preferred which cure in less than 2 minutes at a temperature of 90° to 200° C. when in film form on a substrate. The temperature selected for curing in any specific case will be governed by the application for which the composition is being used.

The catalysed coating composition of the invention can be cured to non-migratory films having excellent release properties by applying to a substrate and thereafter exposing to a temperature of, for example, 150° C. or higher for a few seconds or to a lower temperature for a longer period, for example, some 15 seconds at 120° C. or about 1 minute at 90° C. The substrate to which the composition is applied may be any solid surface on which it is desired to confer release properties. Suitable substrates include glass, stone and ceramics, plastics including polyolefin and polyester films and fabrics, for example polypropylene and polyethylene terephthalate films and fabrics, cellulosic materials including films and fabrics such as wool, cotton and paper including glassine, parchment, kraft and tissue, and metals such as aluminium foil. The compositions are, however, particularly valuable for use in processes such as paper treating which can be carried out continuously at speeds where it is possible to give a dwell time of some 15-30 seconds in a heating zone at 110°-120° C.

The absence of conventional, volatile solvents in the catalysed coating compositions allows coatings to be cured with a lower heat input and avoids the fire and explosion hazards associated with removal of volatile solvents. Gelling of the catalysed coating composition at ambient temperatures can be slowed down by use of small amounts of known inhibitors, e.g. ammonia and its derivatives as described in UK Pat. No. 1,432,339; benzotriazole, triphenyl phosphine, certain stannous and mercury salts, and oximes have also been used for this purpose. The preferred inhibitor is trimethylamine.

A further advantage of the invention is that it provides a means of using a diluted form of the catalyst so that small quantities are easy to measure out, any spillage of the catalyst is a less expensive loss, and the user has better control over variation of the amount used.

The invention is illustrated by the following Examples in which parts and percentages are by weight. In the volatility tests described, the loss in weight includes the small proportion of volatile polysiloxanes present in the composition.

EXAMPLE 1

A catalyst solution was prepared by dissolving 0.0033 part of bis(diethylsulphide)platinum dichloride in 1 part of phenyl allyl ether. This solution was mixed with 1.5 parts of a polysiloxane (A) of the formula:

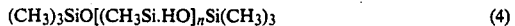

having a viscosity of 28 cP at 20° C., and 7.5 parts of a polysiloxane (B) of the formula:

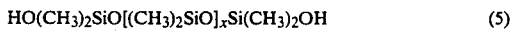

having a viscosity of 77 cP at 20° C. The resultant catalysed coating composition cured on heating for 16 seconds at 125° C.

Volatility 1.0 g of the composition was placed in a flatbottomed aluminium dish of diameter 5.71 cm and heated in a forced draught oven at 150° C. for 1 hour.

For comparison a similar composition was made up using diphenylether (b.p. 259° C.) in place of the phenyl allyl ether (b.p. 192° C.) and heated under the same conditions. The loss in weight of the diphenyl ether composition was 10.3% and of the phenyl allyl ether composition was 3.7%.

EXAMPLE 2

A catalysed coating composition was made up as described in Example 1, but using glycerol-1,2-dicaprylate-3-allyl ether in place of phenyl allyl ether. This composition cured on heating at 125° C. for 15 seconds.

Volatility

A thin layer of the composition was applied to aluminium foil at a coat weight of 7 g/sq.meter, and the coated foil was heated in a forced-draught oven at 150° C. for 2 minutes. The loss in weight was 3.0%.

For comparison, a similar composition was made up using dinonyl adipate in place of the allyl ether compound. The loss in weight was 8.7%.

EXAMPLE 3

A solution of 0.0033 parts of bis(diethyl sulphide) platinum dichloride in 3 parts of glycerol-1,2-dicaprylate-3-allyl ether was added to 2.54 parts of the polysiloxane A of Example 1, 4.46 parts of polysiloxane B of Example 1 and 0.0022 part of trimethylamine. Curing time of the resultant catalysed coating composition at 125° C. was 22 seconds. Volatility measured as in Example 2 was 4.7%.

EXAMPLE 4

A solution of 0.0007 part of bis-(hexa-1,5-diene)-μ-dichlorodirhodium in 1 part of glycerol-1,2-dicaproate-3-allyl ether was added to a mixture of 1.17 parts of a polysiloxane (C) of formula (4) having a viscosity of 15 cP at 20° C. and 2.83 parts of a trimethylsilyl endstopped polymethyl vinyl siloxane (D) having a vinyl content of 5.0% by weight and a viscosity of 440 cP at 20° C. The resultant catalysed coating composition had a curing time of 30 seconds at 125° C. Volatility when measured as per Example 2, but for 3 minutes at 120° C. was 8%.

EXAMPLE 5

A solution of 0.0002 part of bis-(hexa-1,5-diene)-μ-dichlorodirhodium in 1 part of α,α-di(allyloxy) toluene was added to 1.36 parts of polysiloxane C and 2.64 parts of polysiloxane B.

The resultant catalysed coating composition had a curing time of 45 seconds at 125° C. Volatility when measured as per Example 4 was 10%.

EXAMPLE 6

A solution of 0.0023 part of bis-(2,2,5-trimethylhex-3-yne)dichloro-μ-dichlorodiplatinum in 1 part of 2,2,2-tri(allyloxymethyl)ethylacetate was added to 1.3 part of polysiloxane A and 2.7 parts of polysiloxane B and 0.0022 part of trimethylamine.

The resultant catalysed coating composition had a curing time of 20 seconds at 125° C. Volatility when measured as per Example 4 was 1.3%.

EXAMPLE 7

A solution of 0.0033 part of bis(diethylsulphide) platinum dichloride in 2 parts of mono allyl-heptaethyl silicate (obtained as described below) was added to 2.22 parts of polysiloxane A, 5.78 parts of polysiloxane B and 0.0022 part of trimethylamine.

The resultant catalysed coating composition had a curing time of 15 seconds at 125° C. Volatility when measured as per Example 4 was 4.2%.

Allyl-heptaethyl trisilicate

A mixture of 60 parts of octaethyltrisilicate, 6.9 parts of allyl alcohol, 6.8 parts of benzyl alcohol, 17.5 parts of toluene and 0.06 part of p-toluenesulphonic acid was heated to allow a mixture of ethanol and toluene to distil off. On completion the residue was heated at 120° C./15 mm pressure to remove toluene and other volatile constituents, neutralised by stirring with powdered anhydrous sodium carbonate and filtered.

EXAMPLE 8

A solution of 0.0036 part of trimethylamine and sufficient of the catalyst obtained as described in Example 1 of U.S. Pat. No. 3,220,972 to contain 0.0012 part of platinum, in 2 parts of n-2,2-di(allyloxymethyl)-butylisobutyrate was mixed with 1.87 parts of polysiloxane C, and 6.13 parts of polysiloxane D.

The resulting catalysed coating composition had a gelling time at 20° C. of over 8 hours, a curing time at 125° C. of 14 seconds, and volatility measured as per Example 2 of 11%. A similar composition omitting the trimethylamine had a gel time of 30 minutes.

EXAMPLE 9

A solution of 0.005 part of styrene platinum dichloride in 1 part of n-2,2-di(allyloxymethyl)butyl acetate was mixed with 1.3 parts of polysiloxane A, 2.7 parts of polysiloxane B, and 0.0022 part of trimethylamine.

The resulting catalysed coating composition had a curing time of 15 seconds at 125° C. Volatility when measured as per Example 4 was 4.3%.

EXAMPLE 10

A solution of 0.0065 part of bis(diethylsulphide) platinum dichloride in 2 parts of n-2,2-di(allyloxymethyl)

butyl acetate was mixed with 2.92 parts of polysiloxane A, 15.08 parts of polysiloxane B and 0.0043 part of trimethylamine.

The resulting catalysed coating composition had its gel time measured by the method described in Example 1 of UK Patent No. 1432339 and was found to be 23¼ hours. Volatility measured as per Example 2 was 2.7%. Having been aged at ambient temperature for 1 hour, the curing time for a 7 g/sq.m. coating on paper was 19 seconds at 124° C.

EXAMPLE 11

This was a repeat of Example 10 in which the trimethylamine was replaced by 0.0074 parts of triethylamine.

The resulting catalysed coating composition had a gel time of 4¼ hours, a volatility of 3.1% and a cure time of 23 seconds.

I claim:

1. A catalyst composition comprising a solution of an organo-metallic complex of platinum or rhodium in a liquid allyl ether compound which,
   (a) is free from groups having a deleterious effect on the catalytic activity of the organo-metallic complex as a catalyst for the condensation of polysiloxanes containing silicon bonded hydrogen with diorganopolysiloxanes containing silicon-bonded hydroxy or allyl or vinyl groups, and
   (b) has a boiling point of at least 150° C. at 1 bar pressure.

2. A solution as claimed in claim 1 wherein the liquid allyl ether compound contains only carbon, hydrogen and oxygen atoms, and is free from groups containing labile hydrogen atoms.

3. A solution as claimed in claim 2 wherein the liquid allyl ether is a diallyl ether of a monoacylated aliphatic trihydroxy compound.

4. A heat-curable catalyzed polysiloxane coating composition containing at least two liquid organo polysiloxanes, at least one of which contains silicon-bonded hydrogen, and at least one of which contains silicon-bonded hydroxyl, allyl or vinyl groups, together with an organo-metallic complex of platinum or rhodium wherein the improvement comprises having present sufficient of a liquid allyl ether compound to dissolve said organo-metallic complex in the composition, said liquid allyl ether compound being
   (a) free from groups having a deleterious effect on the catalytic activity of the organo-metallic complex as a catalyst for the condensation of polysiloxanes containing silicon bonded hydrogen with diorganopolysiloxanes containing silicon-bonded hydroxy or allyl or vinyl groups, and
   (b) has a boiling point of at least 150° C. at 1 bar pressure.

5. A process for coating a substrate with a release coating by applying to the substrate a heat curable catalyzed polysiloxane coating composition containing at least two liquid organopolysiloxanes, at least one of which contains silicon-bonded hydrogen and at least one of which contains silicon-bonded hydroxyl, allyl or vinyl groups, together with an organo-metallic complex of platinum or rhodium and heating to cure the composition wherein the improvement comprises having present in the composition sufficient of a liquid allyl ether compound to dissolve said organo-metallic complex in the composition, said liquid allyl ether compound being
   (a) free from groups having a deleterious effect on the catalytic activity of the organo-metallic complex as a catalyst for the condensation of polysiloxanes containing silicon bonded hydrogen with diorganopolysiloxanes containing silicon-bond hydroxy or allyl or vinyl groups, and
   (b) has a boiling point of at least 150° C. at 1 bar pressure.

* * * * *